(12) United States Patent
Suheil

(10) Patent No.: US 10,108,167 B2
(45) Date of Patent: Oct. 23, 2018

(54) SYSTEMS AND METHODS FOR ADJUSTING PRODUCTION OF A WELL USING GAS INJECTION

(71) Applicant: ROCKWELL AUTOMATION ASIA PACIFIC BUSINESS CENTER PTE. LTD., Singapore (SG)

(72) Inventor: Hassan S. Suheil, Houston, TX (US)

(73) Assignee: ROCKWELL AUTOMATION ASIA PACIFIC BUSINESS CENTER PTE. LTD., Singapore (SG)

( * ) Notice: Subject to any disclaimer, the term of this patent is extended or adjusted under 35 U.S.C. 154(b) by 448 days.

(21) Appl. No.: 14/927,342

(22) Filed: Oct. 29, 2015

(65) Prior Publication Data

US 2017/0122085 A1 May 4, 2017

(51) Int. Cl.
| | |
|---|---|
| *E21B 43/16* | (2006.01) |
| *E21B 47/06* | (2012.01) |
| *E21B 47/10* | (2012.01) |
| *G01V 99/00* | (2009.01) |
| *G05B 19/05* | (2006.01) |
| *E21B 43/12* | (2006.01) |

(52) U.S. Cl.
CPC .............. *G05B 19/05* (2013.01); *E21B 43/12* (2013.01); *G01V 99/005* (2013.01); *G05B 2219/13044* (2013.01)

(58) Field of Classification Search
CPC .... E21B 41/0092; E21B 43/12; E21B 43/168; E21B 47/06; E21B 47/065; E21B 47/10; G01V 99/005; G05B 19/05
See application file for complete search history.

(56) References Cited

U.S. PATENT DOCUMENTS

| | | | | |
|---|---|---|---|---|
| 4,921,048 | A * | 5/1990 | Crow .................... | E21B 43/121 137/624.2 |
| 5,634,522 | A * | 6/1997 | Hershberger .......... | E21B 43/12 166/372 |
| 6,595,294 | B1 * | 7/2003 | Dalsmo ................ | E21B 43/122 166/250.01 |
| 2017/0122085 | A1 * | 5/2017 | Suheil .................. | G01V 99/005 |
| 2017/0356279 | A1 * | 12/2017 | Nandola ............... | E21B 43/168 |

\* cited by examiner

*Primary Examiner* — Daniel P Stephenson
(74) *Attorney, Agent, or Firm* — Fletcher Yoder, P.C.

(57) ABSTRACT

A system may include a monitoring device that receives data associated with one or more properties at a well. The monitoring device may determine a plurality of expected flow rates of hydrocarbons produced from the well with respect to a plurality of gas injection rates associated with the well based on the data and a hydrocarbon model. The hydrocarbon model may estimate the plurality of expected flow rates of hydrocarbons. The monitoring device may then adjust a gas injection rate at the well based on the plurality of expected flow rates of hydrocarbons.

20 Claims, 10 Drawing Sheets

| VARYING WELLHEAD PRESSURE | | | |
|---|---|---|---|
| WELLHEAD PRESSURE | OIL FLOWRATE | OIL+WATER FLOWRATE | WATER FLOWRATE |
| 197 | 3569 | 6373 | 2804 |
| 250 | 3498 | 6247 | 2749 |
| 350 | 3328 | 5943 | 2615 |
| 449 | 3119 | 5569 | 2450 |
| 549 | 2886 | 5154 | 2268 |
| 650 | 2618 | 4675 | 2057 |
| 751 | 2334 | 4168 | 1834 |
| 846 | 2025 | 3616 | 1591 |
| 945 | 1700 | 3036 | 1336 |
| 1041 | 1328 | 2371 | 1043 |
| 1146 | 950 | 1697 | 747 |
| 1196 | 731 | 1305 | 574 |

FIG. 12

SYSTEMS AND METHODS FOR ADJUSTING PRODUCTION OF A WELL USING GAS INJECTION

BACKGROUND

The present disclosure relates generally to adjusting various properties of production at a hydrocarbon well site. More specifically, the present disclosure relates to providing a local system for adjusting the production of hydrocarbons being extracted from the hydrocarbon well site using various gas injection techniques.

As hydrocarbons are extracted from hydrocarbon reservoirs via hydrocarbon wells in oil and/or gas fields, the extracted hydrocarbons may be transported to various types of equipment, tanks, and the like via a network of pipelines. For example, the hydrocarbons may be extracted from the reservoirs via the hydrocarbon wells and may then be transported, via the network of pipelines, from the wells to various processing stations that may perform various phases of hydrocarbon processing to make the produced hydrocarbons available for use or transport.

Information related to the extracted hydrocarbons or related to the equipment transporting, storing, or processing the extracted hydrocarbons may be gathered at the well site or at various locations along the network of pipelines. This information or data may be used to ensure that the well site or pipelines are operating safely and that the extracted hydrocarbons have certain desired qualities (e.g., flow rate, temperature). The data related to the extracted hydrocarbons may be acquired using monitoring devices that may include sensors that acquire the data and transmitters that transmit the data to computing devices, routers, other monitoring devices, and the like, such that well site personnel and/or off-site personnel may view and analyze the data.

Generally, the data available to well site personnel may not have access to certain information in real time or near real time at the well site. As such, the well site personnel may be limited with regard to controlling, analyzing, or optimizing the hydrocarbon production at a well site. That is, to optimize hydrocarbon production at the well site, well site personnel should quickly analyze data available at the well site and make decisions regarding the operations at the well site based on the analysis of the data. However, the data available at the well site often may not include certain information that may enable the well site personnel to make decisions regarding the operations at the well site. Accordingly, it is now recognized that improved systems and methods for providing additional information regarding various properties regarding a hydrocarbon well site at the hydrocarbon well site are desirable.

BRIEF DESCRIPTION

In one embodiment, a system may include a monitoring device that receives data associated with one or more properties at a well. The monitoring device may determine a plurality of expected flow rates of hydrocarbons produced from the well with respect to a plurality of gas injection rates associated with the well based on the data and a hydrocarbon model. The hydrocarbon model may estimate the plurality of expected flow rates of hydrocarbons. The monitoring device may then adjust a gas injection rate at the well based on the plurality of expected flow rates of hydrocarbons.

In another embodiment, a system may include a monitoring device that may receive data associated with one or more properties at a well. The monitoring device may determine a plurality of expected flow rates of hydrocarbons produced from a plurality of wells with respect to a plurality of gas injection rates based on the data. The monitoring device may also adjust a gas injection rate at the well based on the plurality of expected flow rates of hydrocarbons.

In yet another embodiment, a method may include receiving, via a processor, data associated with one or more properties at a well. The method may also include determining a plurality of expected flow rates of hydrocarbons produced from the well with respect to a plurality of gas injection rates associated with the well based on the data and a hydrocarbon model configured to estimate the plurality of expected flow rates of hydrocarbons. The method may then include adjusting a gas injection rate at the well based on the plurality of expected flow rates of hydrocarbons.

DRAWINGS

These and other features, aspects, and advantages of the present invention will become better understood when the following detailed description is read with reference to the accompanying drawings in which like characters represent like parts throughout the drawings, wherein:

FIG. 12 illustrates a chart of wellhead pressure with respect to total flow rates, oil flow rates, and water flow rates, in accordance with embodiments presented herein.

DETAILED DESCRIPTION

Figure 1:
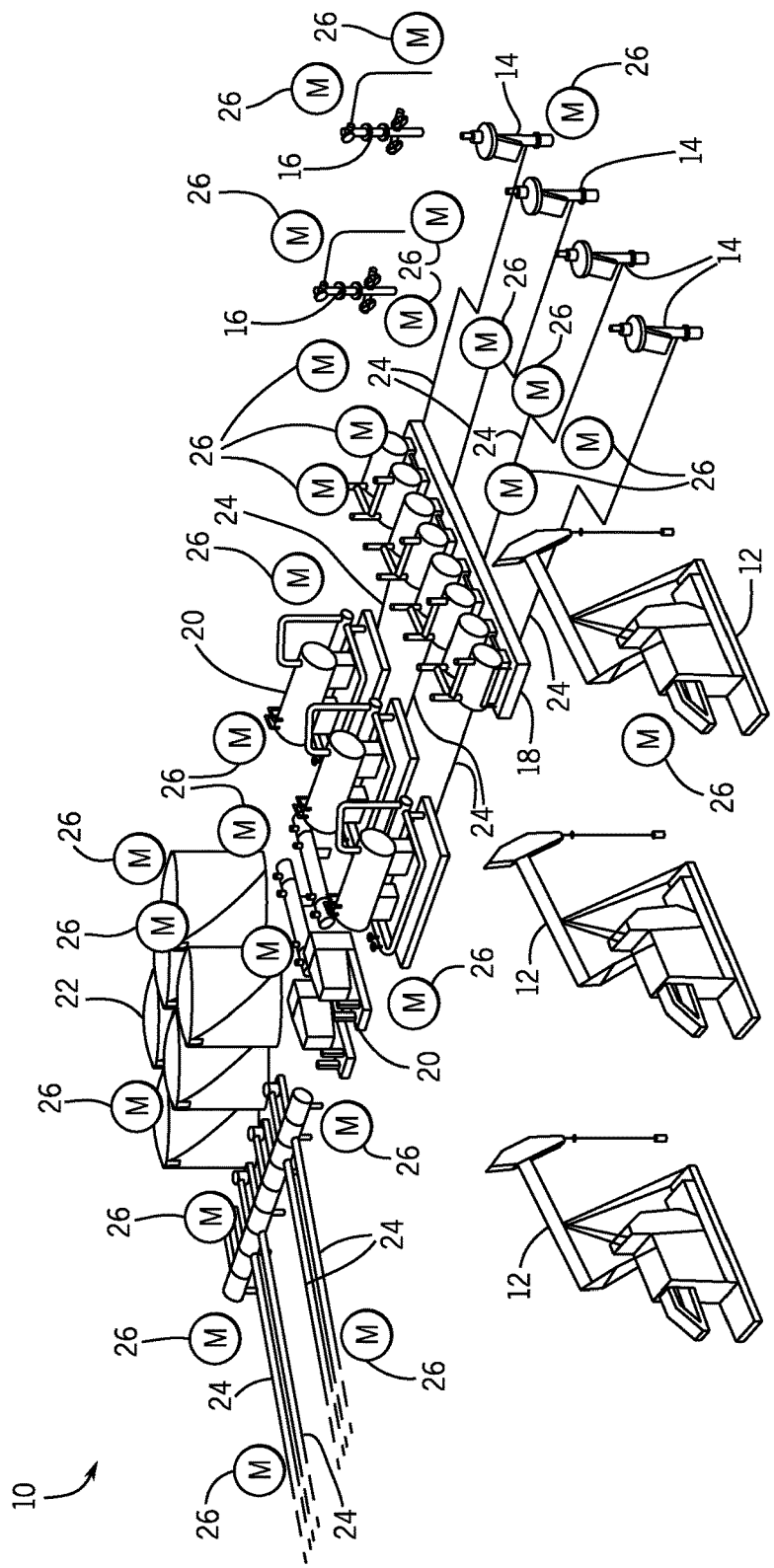
FIG. 1 illustrates a schematic diagram of an example hydrocarbon site that may produce and process hydrocarbons, in accordance with embodiments presented herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure are generally directed towards improved systems and methods for providing hydrocarbon production analysis data at a hydrocarbon well site in real time or near real time. Moreover, embodiments of the present disclosure are related to improved systems and methods for adjusting the production or flow rate of hydrocarbons being produced at a well in the hydrocarbon well site by adjusting gas being injected into the respective well.

Hydrocarbon production generally produces oil, water, gas, and sand together. Each of these items is commonly known a phase of the production. By knowing the content or amount of water, oil (e.g., hydrocarbon), and gas or water, oil, gas, and sand in production fluids, an operator may better understand the properties of the reservoir from which the production fluids are being extracted. Moreover, the operator may adjust various control measures (e.g., pressure, flow) at a well site where the hydrocarbons are being produced.

In some cases, the phases of the production fluids are physically separated using a separator and then measured to determine the multiphase composition of the hydrocarbons being produced. In one embodiment, a monitoring system located at a wellhead, in a remote terminal unit (RTU) may determine the amount of each phase in the production fluids while the production fluids are being extracted or flowing at the well site. The monitoring system may determine these phase measurements based on a hydrocarbon model that estimates the multiphase properties of the flow of hydrocarbons (e.g., oil, water, gas, sand) based on physical properties of the hydrocarbons being extracted and certain data available at the well site. The hydrocarbon model may provide information regarding flow properties of various hydrocarbon fluids being produced at a well site based on surface characteristics at the well site. For instance, the hydrocarbon model may provide real-time or near real-time estimates of at least one phase of oil, water, and gas production at a well site based on predetermined well characteristics (e.g., well completion data, such as depth, type of pipe; reservoir data, such as free static pressure; and pressure-volume-temperature (PVT) sets/assays from the same or a nearby well), and dynamically measured data (e.g., pressure and temperature data at the well site).

In addition to estimating the multiphase properties being produced at the well site, the monitoring system may determine the flow rate of hydrocarbons being produced at the well based on the dynamically measured data. In one embodiment, the monitoring system may simulate the production or flow rates of hydrocarbons at the well under various conditions (e.g., gas injection rate, watercut values, wellhead pressure). Using the simulated results of flow rates under various operating conditions, the monitoring system may identify a desired flow rate and a corresponding desired operating condition. For instance, although the injection of gas into a well may increase the flow rate of hydrocarbons, the injection of gas may also alter the geographical properties of the reservoir and may reduce the total amount of hydrocarbons that may be extracted from the reservoir over time. As such, the monitoring system may adjust the gas injection rate provided to a well while taking care not to increase the gas injection rate over some threshold. Additional details regarding estimating the multiphase properties at the well site will be discussed below with reference to FIGS. 1-12.

By way of introduction, FIG. 1 illustrates a schematic diagram of an example hydrocarbon site 10. The hydrocarbon site 10 may be an area in which hydrocarbons, such as crude oil and natural gas, may be extracted from the ground, processed, and stored. As such, the hydrocarbon site 10 may include a number of wells and a number of well devices that may control the flow of hydrocarbons being extracted from the wells. In one embodiment, the well devices in the hydrocarbon site 10 may include pumpjacks 12, submersible pumps 14, well trees 16, and the like. After the hydrocarbons ar extracted from the surface via the well devices, the extracted hydrocarbons may be distributed to other devices such as wellhead distribution manifolds 18, separators 20, storage tanks 22, and the like. At the hydrocarbon site 10, the pumpjacks 12, submersible pumps 14, well trees 16, wellhead distribution manifolds 18, separators 20, and storage tanks 22 may be connected together via a network of pipelines 24. As such, hydrocarbons extracted from a reservoir may be transported to various locations at the hydrocarbon site 10 via the network of pipelines 24.

The pumpjack 12 may mechanically lift hydrocarbons (e.g., oil) out of a well when a bottom hole pressure of the well is not sufficient to extract the hydrocarbons to the surface. The submersible pump 14 may be an assembly that may be submerged in a hydrocarbon liquid that may be pumped. As such, the submersible pump 14 may include a hermetically sealed motor, such that liquids may not penetrate the seal into the motor. Further, the hermetically sealed motor may push hydrocarbons from underground areas or the reservoir to the surface.

The well trees 16 or Christmas trees may be an assembly of valves, spools, and fittings used for natural flowing wells. As such, the well trees 16 may be used for an oil well, gas well, water injection well, water disposal well, gas injection well, condensate well, and the like. The wellhead distribution manifolds 18 may collect the hydrocarbons that may have been extracted by the pumpjacks 12, the submersible pumps 14, and the well trees 16, such that the collected hydrocarbons may be routed to various hydrocarbon processing or storage areas in the hydrocarbon site 10.

The separator 20 may include a pressure vessel that may separate well fluids produced from oil and gas wells into separate gas and liquid components for the produced oil, water, gas, or sand. For example, the separator 20 may separate hydrocarbons extracted by the pumpjacks 12, the submersible pumps 14, or the well trees 16 into oil components, gas components, and water components. After the hydrocarbons have been separated, each separated component may be stored in a particular storage tank 22. The hydrocarbons stored in the storage tanks 22 may be transported via the pipelines 24 to transport vehicles, refineries, and the like.

Although the separator 20 may provide information regarding the different phases of the hydrocarbons being produced at a well site, separating the hydrocarbons into the different components may take some time. Moreover, since the separator 20 is located away from the well site or a well head where the hydrocarbons are being produced from the ground, data regarding the multiphase properties of the produced hydrocarbons may not be available at the well site where the operator may adjust various parameters related to the production of the hydrocarbons based on the multiphase properties of the produced hydrocarbons.

The hydrocarbon site 10 may also include monitoring systems 26 that may be placed at various locations in the hydrocarbon site 10 to monitor or provide information related to certain aspects (e.g., multiphase properties) of the hydrocarbon site 10. As such, the monitoring system 26 may be a controller, a remote terminal unit (RTU), or any computing device that may include communication abilities, processing abilities, and the like. The monitoring system 26 may include sensors or may be coupled to various sensors that may monitor various properties associated with a component at the hydrocarbon site 10. The monitoring system 26 may then analyze the various properties associated with the component and may control various operational parameters of the component. For example, the monitoring system 26 may measure a pressure or a differential pressure of a well or a component (e.g., storage tank 22) in the hydrocarbon site 10. The monitoring system 26 may also measure a temperature of contents stored inside a component in the hydrocarbon site 10, an amount of hydrocarbons being processed or extracted by components in the hydrocarbon site 10, and the like. The monitoring system 26 may also measure a level or amount of hydrocarbons stored in a component, such as the storage tank 22. In certain embodiment, the monitoring systems 26 may be iSens-GP Pressure Transmitter, iSens-DP Differential Pressure Transmitter, iSens-MV Multivariable Transmitter, iSens-T2 Temperature Transmitter, iSens-L Level Transmitter, or Isens-IO Flexible I/O Transmitter manufactured by vMonitor® or Rockwell Automation®.

In one embodiment, the monitoring system 26 may include a sensor that may measure pressure, temperature, fill level, flow rates, and the like. The monitoring system 26 may also include a transmitter, such as a radio wave transmitter, that may transmit data acquired by the sensor via an antenna or the like. In one embodiment, the sensor in the monitoring system 26 may be wireless sensors that may be capable of receive and sending data signals between monitoring systems 26. To power the sensors and the transmitters, the monitoring system 26 may include a battery or may be coupled to a continuous power supply. Since the monitoring system 26 may be installed in harsh outdoor and/or explosion-hazardous environments, the monitoring system 26 may be enclosed in an explosion-proof container that may meet certain standards established by the National Electrical Manufacturer Association (NEMA) and the like.

The monitoring system 26 may transmit data acquired by the sensor or data processed by a processor to other monitoring systems, a router device, a supervisory control and data acquisition (SCADA) device, or the like. As such, the monitoring system 26 may enable users to monitor various properties of various components in the hydrocarbon site without being physically located near the corresponding components.

Figure 2:
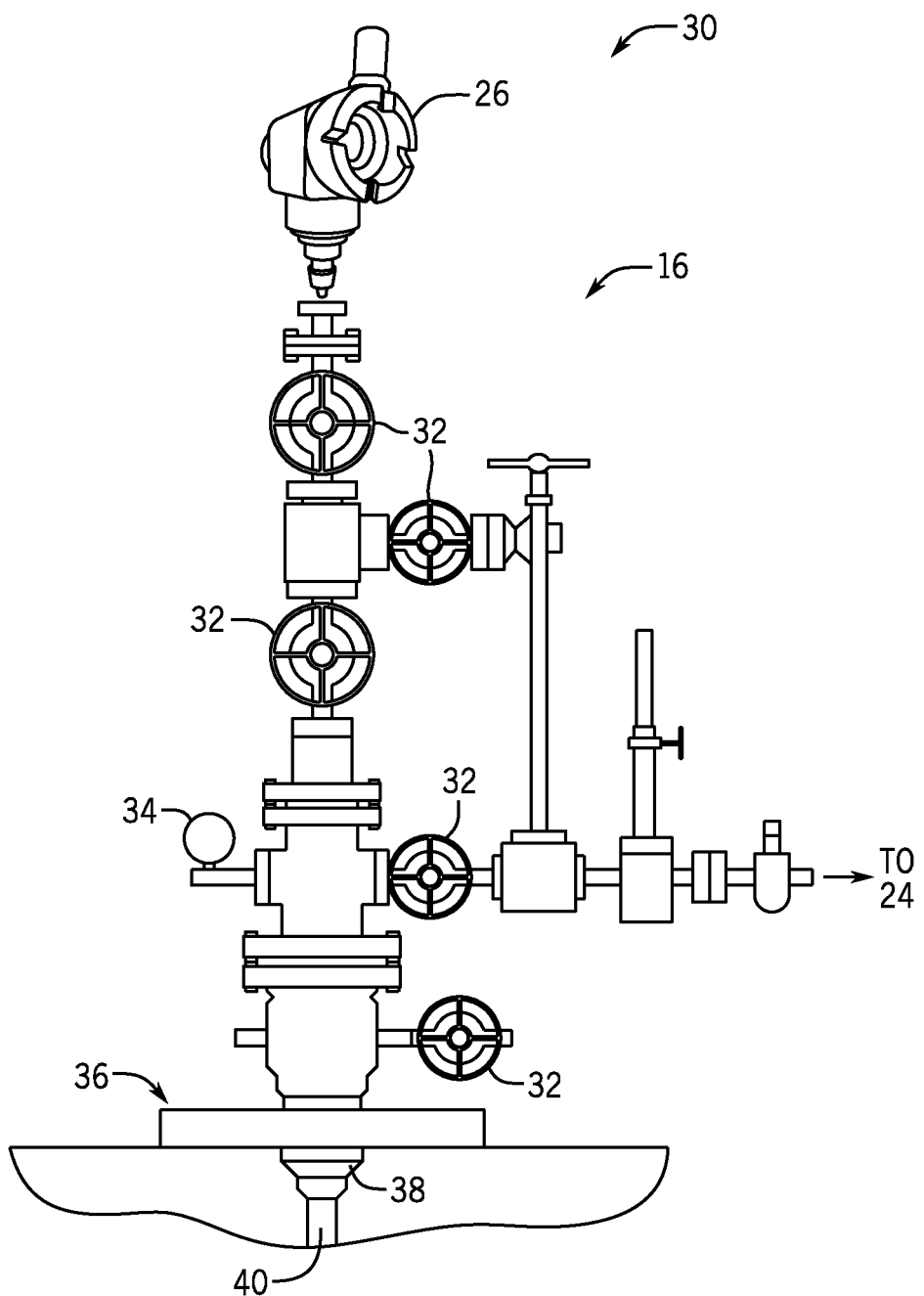
FIG. 2 illustrates a front view of an example well-monitoring system used in the hydrocarbon site of FIG. 1, in accordance with embodiments presented herein.

Keeping the foregoing in mind, FIG. 2 illustrates an example of a well-monitoring system 30 that includes the monitoring system 26 and the well tree 16. Although the well-monitoring system 30 is illustrated as the monitoring system 26 coupled to the well tree 16, it should be noted that the monitoring system 26 may be coupled to any well device or may be coupled to another free-standing structure.

Referring now to FIG. 2, the well tree 16 may include a number of valves 32 that may control the flow of the extracted hydrocarbons to the network of pipelines 24 and the like. The well tree 16 may also include various gauges 34 that may receive information related to the pressure, temperature, flow, and other attributes associated with the well tree 16. A portion of the well tree 16 that meets the surface of the Earth may correspond to a wellhead 36. The wellhead 36 may be coupled to a casing 38 and a tubing 40. Generally, the wellhead 36 may include various components and structures to support the casing 38 and the tubing 40 being routed into a borehole of the well. Moreover, the wellhead 36 also provides a structure at which the well tree 16 may be attached to the casing 38 and the tubing 40.

The casing 38 may be a large diameter pipe that is assembled and inserted into a drilled section of a borehole and may be held into place with cement. The tubing 40 may be placed within the casing 38 and may include a tube used in the borehole in which hydrocarbons may be extracted from a reservoir.

In one embodiment, the monitoring system 26 may receive real-time or near real-time data associated with the wellhead 30 such as, for example, tubing head pressure, tubing head temperature, case head pressure, flowline pressure, wellhead pressure, wellhead temperature, and the like. The monitoring system 26 may receive the real-time data from the gauges 34, sensors disposed in the casing 38, sensors disposed in the tubing 40, and the like. In any case, the monitoring system 26 may analyze the real-time data with respect to static data that may be stored in a memory of the monitoring system 26. The static data may include a well depth, a tubing length, a tubing size, a choke size, a reservoir pressure, a bottomhole temperature, well test data, fluid properties of the hydrocarbons being extracted, and the like. The monitoring system 26 may also analyze the real-time data with respect to other data acquired by various types of instruments (e.g., water cut meter, multiphase meter) to determine the multiphase properties of the hydrocarbons being produced at the well site.

Figure 3:
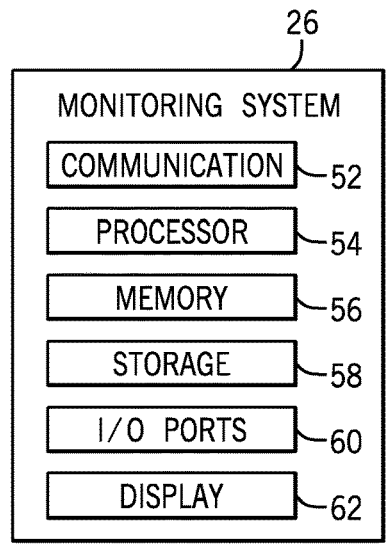
FIG. 3 illustrates a block diagram of a monitoring system that may be employed in the hydrocarbon site of FIG. 1, in accordance with embodiments presented herein.

Keeping this in mind, FIG. 3 illustrates a block diagram of various components that may be part of the monitoring system 26 and may be used by the monitoring system 26 to perform various analysis operations. As shown in FIG. 3, the monitoring system 26 may include a communication component 52, a processor 54, a memory 56, a storage 58, input/output (I/O) ports 60, a display 62, and the like. The communication component 52 may be a wireless or wired communication component that may facilitate communication between different monitoring systems 26, gateway communication devices, various control systems, and the like. The processor 54 may be any type of computer processor or microprocessor capable of executing computer-executable code. The memory 56 and the storage 58 may be any suitable articles of manufacture that can serve as media to store processor-executable code, data, or the like. These articles of manufacture may represent computer-readable media (i.e., any suitable form of memory or storage) that may store the processor-executable code used by the processor 34 to perform the presently disclosed techniques. The memory 56 and the storage 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to pressure sensors, flow sensors, temperature sensors, and the like. As such, the monitoring system 26 may receive data associated with a well via the I/O ports 60. The I/O ports 60 may also serve as an interface to enable the monitoring system 26 to connect and communicate with surface instrumentation, flow meters, water cut meters, multiphase meters, and the like.

In addition to receiving data via the I/O ports 60, the monitoring system 26 may control various devices via the I/O ports 60. For example, the monitoring system 26 may be communicatively coupled to an actuator or motor that may modify the size of a choke that may be part of the well. The choke may control a fluid flow rate of the hydrocarbons being extracted at the well or a downstream system pressure within the network of pipelines 24 or the like. In one embodiment, the choke may be an adjustable choke that may receive commands from the monitoring system 26 to change the fluid flow and pressure parameters at the well.

The display 62 may include any type of electronic display such as a liquid crystal display, a light-emitting-diode display, and the like. As such, data acquired via the I/O ports and/or data analyzed by the processor 54 may be presented on the display 62, such that operators having access to the monitoring system 26 may view the acquired data or analyzed data at the hydrocarbon well site. In certain embodiments, the display 62 may be a touch screen display or any other type of display capable of receiving inputs from the operator.

Figure 4:
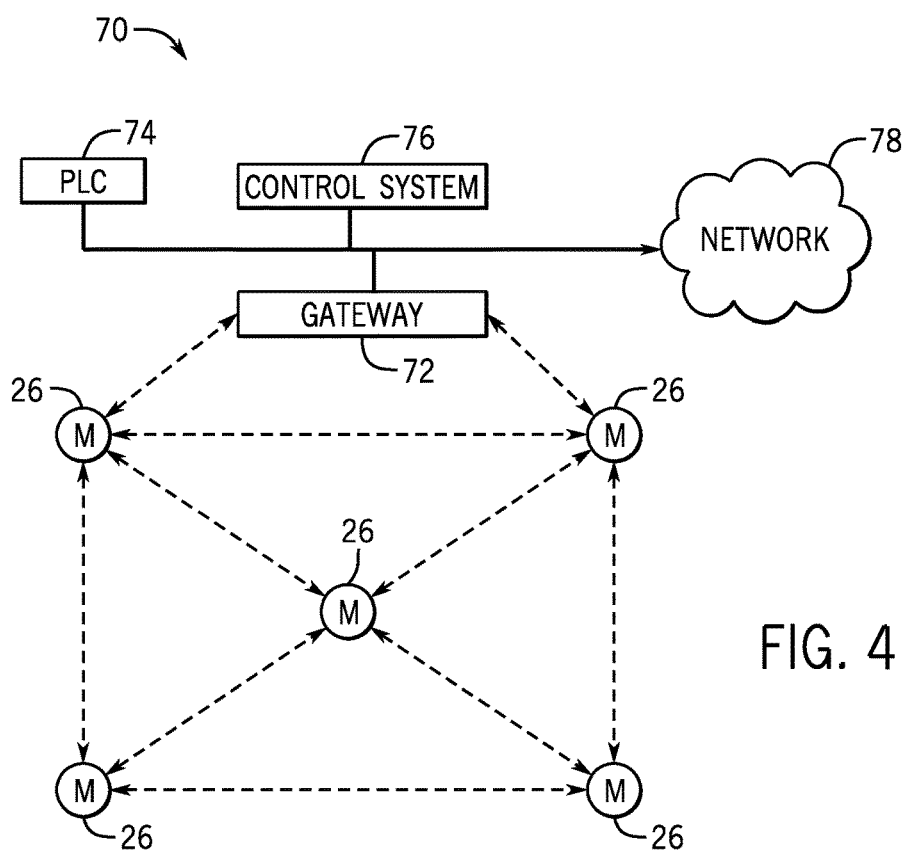
FIG. 4 illustrates a communication network that may be employed in the hydrocarbon site of FIG. 1, in accordance with embodiments presented herein.

Referring back to the communication component 52, the monitoring system 26 may use the communication component 52 to communicatively couple to various devices in the hydrocarbon site 10. FIG. 4, for instance, illustrates an example communication network 70 that may be employed in the hydrocarbon site 10. As shown in FIG. 4, each monitoring system 26 may be communicate with one or more other monitoring systems 26. That is, each monitoring system 26 may communicate with certain monitoring systems 26 that may be located within some range of the respective monitoring system 26. Each monitoring system 26 may communicate with each other via its respective communication component 52. As such, each monitoring system 26 may transfer raw data acquired at its respective location, analyzed data (e.g., multiphase measurements) associated with a respective well, or the like to each other. In one embodiment, the monitoring systems 26 may route the data to a gateway device 72. The gateway device 72 may be a network device that may interface with other networks or devices that may use different communication protocols. As such, the gateway device 72 may include similar components as the monitoring components 26. However, since the gateway device 72 may not be located at the well site or coupled to a well device, the gateway device 72 may have a larger form factor as compared to the monitoring system 26. Additionally, since the gateway device 72 may receive and process data acquired from multiple monitoring systems 26, the gateway device 72 may use a larger battery or power source as compared to the monitoring system 26 to process the additional data. In this manner, the gateway device 72 may also include a larger and/or faster processor 54, a larger memory 56, and a larger storage 58, as compared to the monitoring system 26.

After receiving data from the monitoring systems 26, the gateway device 72 may provide the data from each monitoring system 26 to various types of devices, such as a programmable logic controller (PLC) 74, a control system 76, and the like. The PLC 74 may include a digital computer that may control various components or machines in the hydrocarbon site 10. The control system 76 may include a computer-controlled system that monitors the data received via the monitoring devices 26 and may and control various components in the hydrocarbon site 10 and various processes performed on the extracted hydrocarbons by the components. For example, the control system 76 may be a supervisory control and data acquisition (SCADA), which may control large-scale processes, such as industrial, infrastructure, and facility-based processes, that may include multiple hydrocarbon sites 10 separated by large distances.

The gateway device 22 may also be coupled to a network 78. The network 78 may include any communication network, such as the Internet or the like, that may enable the monitoring systems 26, the gateway 72, the PLC 74, the control system 76, and the like to communicate with other like devices.

As mentioned above, each monitoring system 26 may acquire data from various sensors disposed throughout a respective well, the hydrocarbon well site, and the like. To enable well site personnel (i.e., operators physically located at the well site) to ensure that the well is operating efficiently, the monitoring system 26 may perform some initial data analysis using the processor 54 and may output the results of the data analysis via the display 62. In certain embodiments, the monitoring device 26 may transmit the results of the data analysis to a handheld electronic device (e.g., mobile phone, tablet computer, laptop computer, etc.) via the communication component 52 using a communication protocol, such as Bluetooth® or any other wireless or wired protocol. After receiving the results of the data analysis via the display 62 or the handheld electronic device, the operator may modify various operating parameters of the well based on the results. That is, the operator may interpret the analyzed data (e.g., multiphase measurements) and modify the operating parameters of the well to increase the efficiency at which the well may produce hydrocarbons. In one embodiment, the monitoring system 26 may automatically determine whether the operating parameters of the well are desirable based on the results of the data analysis to achieve a desired efficiency or operating point of the well.

Figure 5:
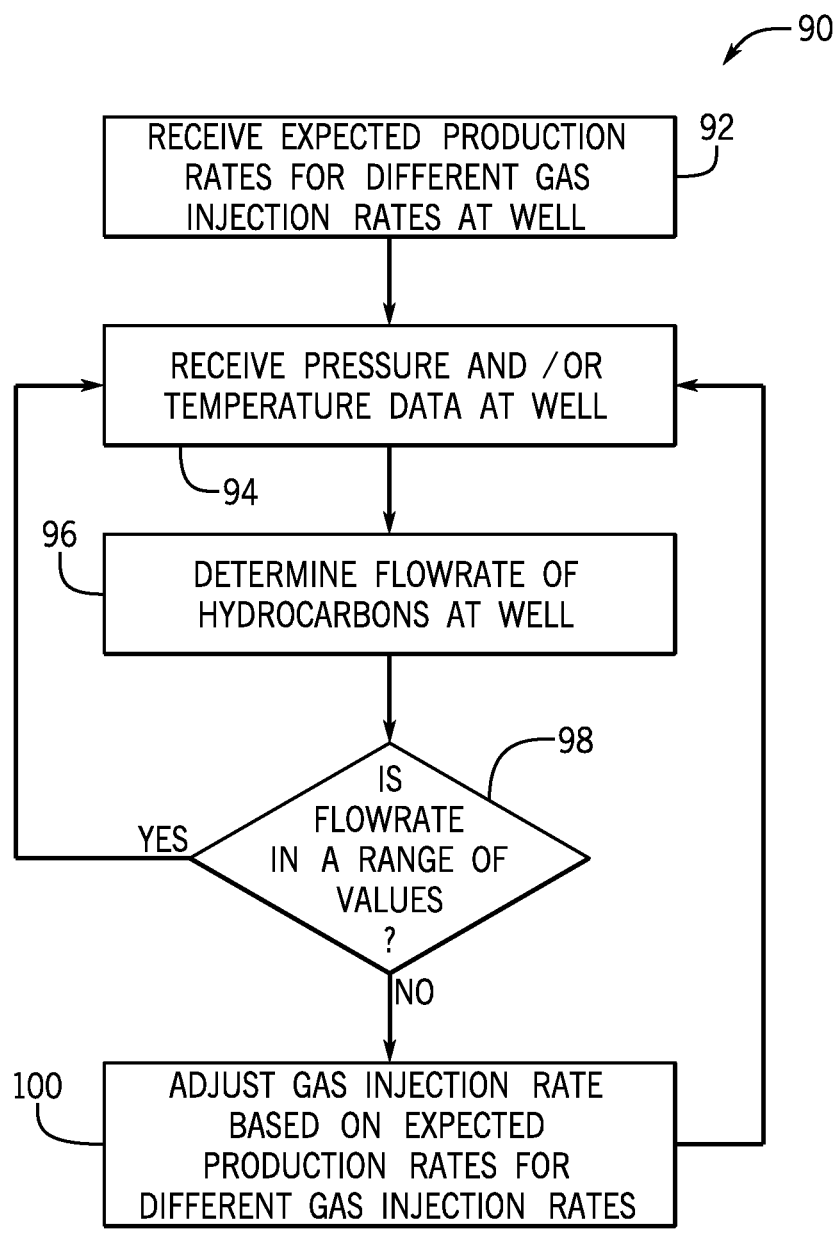
FIG. 5 illustrates a flowchart of a method for adjusting the production of hydrocarbons being produced at the hydrocarbon site of FIG. 1 based on a gas injection rate used at a well, in accordance with embodiments presented herein.

Keeping this in mind, FIG. 5 illustrates a flowchart of a method 90 that the monitoring system 26 or any suitable computing device may employ for determining adjusting the flow rate of hydrocarbons being produced at a well in the hydrocarbon site 10. The method 90 may be used for monitoring and/or controlling the operations of natural flowing wells or wells that use artificial lifts to extract hydrocarbons from a reservoir. In either case, since the monitoring system 26 is disposed at the well site, the operations of the well may be monitored, controlled, and operated locally. In this manner, the operations of the well may be optimized or monitored with or without an established communication link to gateway device 72, the PLC 74, the control system 76 (e.g., SCADA), the network 78, or the like. Moreover, since the adjustments of gas injection rates at a well is performed by the monitoring system 26 located at the well, the well may adjust the operational characteristics of the well based on real or near-real time measurements, thereby improving the efficiency in which the well operates (e.g., produced hydrocarbons).

Although the following description of the method 90 describes a certain procedure, it should be noted that the procedure should not be limited to the order that is depicted in FIG. 5. Instead, it should be understood that the procedure may be performed in any suitable order. Moreover, it should be noted that, in some embodiments, certain portions of the method 90 may not be performed.

Referring now to FIG. 5, at block 92, the monitoring system 26 may receive expected production rates of hydrocarbons produced at a well under different gas injection rates. In one embodiment, the monitoring system 26 may determine the production rate or flow rate of hydrocarbons (e.g., oil, gas, sand, and water) being produced at a well under certain conditions (e.g., pressure, gas injection rate) based on a hydrocarbon model associated with the well.

In one embodiment, the hydrocarbon model may estimate the multiphase properties of a flow of hydrocarbons (e.g., oil, water, gas, sand) and the flow rate of the hydrocarbons based on physical properties of a region in which the hydrocarbons are being extracted, laboratory analysis performed on sample hydrocarbons extracted from the well, information regarding the well, and the like.

In one embodiment, the hydrocarbon model may be a compilation of data acquired from a number of wells located in a number of different regions. The compilation of data may include multiphase properties of the extracted hydrocarbons extracted from a respective well in a respective region at different pressures and temperatures values at the respective well.

The laboratory analysis performed on the sample of extracted hydrocarbons may include pressure-volume-temperature (PVT) coefficients associated with the extracted hydrocarbon. That is, a sample of the hydrocarbon may be tested in a laboratory or the like by compressing the sample and determining the behavior of the hydrocarbon under various conditions (e.g., pressure and temperature conditions). The results of the tests may be stored in an array or matrix of data that indicates the phase properties of the hydrocarbon sample under various pressure and temperature conditions. The matrix of data may be referred to as base assay coefficients that characterize certain properties (e.g., viscosity, density) of the hydrocarbon sample at various pressure and temperature conditions.

In some instances, a hydrocarbon sample may not be available for testing. As such, the PVT coefficients may not be available for the hydrocarbon model. In this case, the PVT coefficients of a sample may be determined based on a best estimate determined according to the geography of the region in which the sample hydrocarbon would be obtained and known PVT coefficients from other hydrocarbon samples obtained from regions having similar geographical properties as the unavailable hydrocarbon sample. The geographical properties may include information regarding a terrain (e.g., hills) of the region, fluid types of the region, whether the region is onshore or offshore, and the like. In one embodiment, a new assay for the unknown hydrocarbon sample may be determined by adjusting a base assay for a hydrocarbon sample extracted from a similar region as the unknown hydrocarbon sample. The new assay may be determine based on reservoir fluid gas-oil ratios (GOR) and American Petroleum Institute (API) gravity values.

The assay may establish PVT relationships for GOR, liquid and gas densities, mixture density, liquid viscosity, and the like regarding the produced hydrocarbons. The multiphase properties of the extracted hydrocarbons may be determined based on the corresponding assay and pressure and temperature data for each increment of the flow of hydrocarbons.

The hydrocarbon model may also determine the multiphase properties of hydrocarbons being extracted at the respective well based on information regarding the respective well. Information regarding the well may include reservoir characteristics, well type (e.g., natural flow, artificial lift), depth, diameter, type of piping used at the well, and the like. The reservoir characteristics may include information regarding free gas of the reservoir, salinity of the reservoir, static bottom hole pressure of the reservoir, and the like. The reservoir characteristics, in some embodiments, may be determined based on a wireline survey of the reservoir. The wireline survey may provide details regarding the reservoir pressure and salinity of water in the reservoir.

Using the collection of information described above, the hydrocarbon model may determine a flowing bottom hole pressure at the bottom of the well. That is, the hydrocarbon model may perform a nodal analysis of various measurements acquired at the surface of the wellhead to determine the flow properties of the hydrocarbons being produced at different positions (e.g., depths) within the well, and ultimately determine downhole characteristics of the flow of hydrocarbons, the downhole pressure, and the like.

In addition, the monitoring system 26 may use the hydrocarbon model to determine the multiphase flow characteristics (e.g., percentages of oil, gas, water, and sand) of the hydrocarbons being produced at the bottom hole and at the wellhead. In other words, the hydrocarbon model may provide real or near-real time analysis of different phases (e.g., oil, water, and gas production) at a well site based on predetermined well characteristics (e.g., well completion data, such as depth, type of pipe; reservoir data, such as free static pressure; and PVT sets/assays from the same or a nearby well), and dynamically measured data, such as pressure, temperature, gas injection rate, and the like. In one embodiment, the monitoring system 26 may provide inputs such as pressure, volume, and temperature (PVT) coefficients regarding a sample of hydrocarbon production from the respective well and pressure and temperature data acquired from the well. Using the hydrocarbon model, the monitoring system 26 may then determine a flowing bottom hole pressure at the bottom of the well and the multiphase flow characteristics (e.g., percentages of oil, gas, and water) of the hydrocarbons being produced at the bottom hole and at the wellhead.

In one embodiment, the monitoring system 26 may use the hydrocarbon model to simulate the flow rates of the hydrocarbons produced at the well under various operations conditions. For instance, the monitoring system 26 may use the hydrocarbon model to determine the flow rates of hydrocarbons under various gas injection rates. When performing this simulation, the hydrocarbon model may use characteristics regarding the well such as degrees American Petroleum Institute (API), watercut (percentage) of the reservoir, gas oil ratio (scf/bbl), reservoir free gas, productivity index (bpd/psi), static reservoir pressure (psi), casing vertical depth (feet), casing inside diameter (inches), tubing vertical depth (feet), tubing inside diameter (inches), tubing thickness (inches), well incline from vertical (degrees), tubing head pressure (psi), and the like as base inputs for the model. After determining the expected flow rate of the hydrocarbons being produced at a well using a particular gas injection rate, the monitoring system 26 may use the hydrocarbon model to determine the expected flow rates of the hydrocarbons being produced at a well using various gas injection rates.

Figure 6:
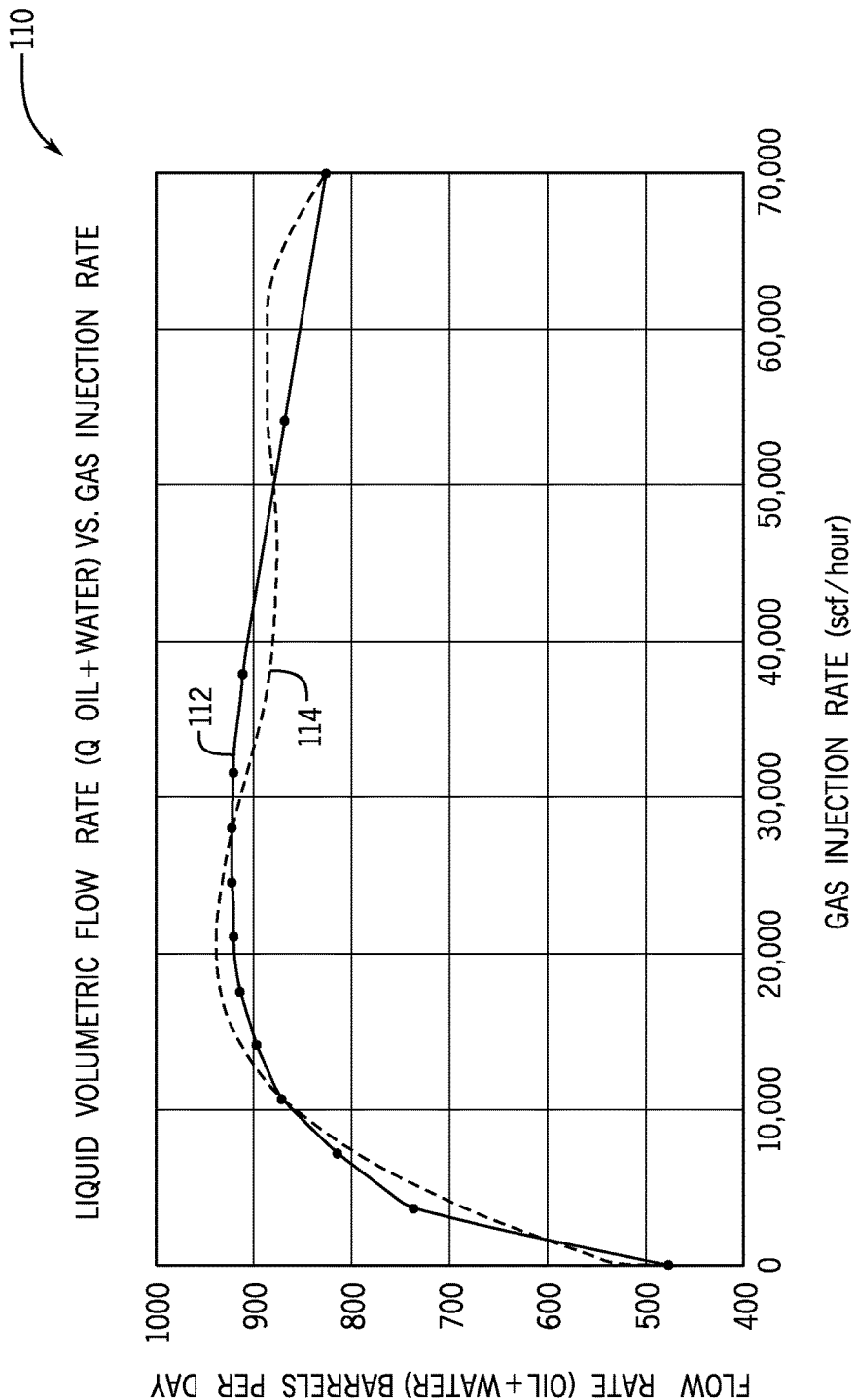
FIG. 6 illustrates an example graph of liquid flow rate of hydrocarbons being produced at a well versus a gas injection rate provided at the well, in accordance with an embodiment.

After determining the expected flow rates of the hydrocarbons being produced at a well using various gas injection rates, the monitoring system 26 may plot these values on a graph of flow rate versus gas injection rate, as provided in an example graph 110 of FIG. 6. Referring to the graph 110 of FIG. 6, the simulated values may be plotted and a line graph 112 may indicate the trend of the simulated results. The monitoring system 26 may then determine a best fit line or mathematical expression that describes the trend of the line graph 112. As shown in FIG. 6, the line graph 114 represents a fourth order polynomial mathematical expression that generally describes the trend of the line graph 112. For example, the line graph 114 may be represented by the following equation:

$$y = -3 \times 10^{-16} x^4 + 4 \times 10^{-11} x^3 - 2 \times 10^{-06} x^2 + 0.0538 x + 518.44$$

In any case, by obtaining a mathematical expression for the trend of the flow rates of hydrocarbons under various gas injection rates for a particular well, the monitoring system 26 may determine whether the current flow rate of hydrocarbons at the well is efficient with respect to the gas injection rate being provided at the well. That is, in some cases, gas may be injected into the casing of a well to adjust the viscosity and weight of the hydrocarbons being produced at the well. However, gas should be injected into the well casing in a controlled manner. That is, injecting gas into the well above some threshold may fracture the reservoir, make gas lift valves inoperable, cause gas lift valves not to actuate at the proper pressures, cause the well to produce the injected gas, decrease the efficiency of the well, and the like. As such, by monitoring the flow rate of the produced hydrocarbons with respect to the gas injection rate, the monitoring system 26 may adjust the gas injection rate to improve the efficiency at which the well produces hydrocarbons while minimizing an amount of gas being injected into the well.

Keeping the foregoing in mind and referring back to FIG. 5, at block 94, the monitoring system 26 may receive real-time (or near real-time) data from various sensors disposed throughout the respective well. Generally, the data may include pressure data and temperature data associated with the respective well. As such, the real-time data may include a tubing head pressure, a tubing head temperature, a casing head pressure, a flowline pressure, a wellhead pressure, a wellhead temperature, and the like.

The tubing head pressure may include a pressure measured at or near a location that correspond to where the tubing 40 may meet the surface in a well. In the same manner, the tubing head temperature may include a temperature measured at or near a location that correspond to where the tubing 40 may meet the surface in a well. The casing head pressure may include a pressure measured at or near a location that correspond to where the casing 38 may meet the surface in a well. The flowline pressure may include a pressure measured at or near a large diameter pipe, which may be a section of the casing 38. The large diameter pipe or flowline may be coupled to a mud tank that may receive drilling fluid as it comes out of a borehole. The wellhead pressure may include a pressure measured at or near a location that corresponds to the surface in a well. In this manner, the wellhead temperature may include a temperature measured at or near a location that corresponds to the surface in a well.

At block 96, the monitoring system 26 may determine the multiphase measurements of the hydrocarbons being produced and/or the flow rate of the hydrocarbons being produced at the well site based on the data received at block 94 and a hydrocarbon model associated with the respective well.

At block 98, the monitoring system 26 may determine whether the flow rate of the hydrocarbons is within some range of values. That is, in certain embodiments, the monitoring system 26 may analyze the expected production rates for different gas injection rates (e.g., hydrocarbon model simulation results) received at block 92 and determine a range of flow rates that may maximize the flow rate of hydrocarbons while minimizing the gas injection rate. For example, if the simulation results for flow rates at various gas injection rates were summarized according to the following table, the monitoring system 26 may select a range of flow rate values that correspond to where the flow rates are relatively high while the gas injection rates are relatively low.

TABLE 1

| Input gas injection rate (scf/hour) | Equates to gas inj. rate (scf/day) | Equates to gas inj. rate (scf/bbl) | Simulated Flow rate Q(oil + water) (bpd) |
|---|---|---|---|
| 0 | 0 | 0 | 475 |
| 3,500 | 84,000 | 114 | 735 |
| 7,000 | 168,000 | 207 | 812 |
| 10,500 | 252,000 | 290 | 869 |
| 14,000 | 336,000 | 375 | 895 |
| 17,500 | 420,000 | 461 | 911 |
| 21,000 | 504,000 | 549 | 918 |
| 24,500 | 588,000 | 639 | 920 |
| 28,000 | 672,000 | 730 | 920 |
| 31,500 | 756,000 | 824 | 918 |
| 37,875 | 909,000 | 1,000 | 909 |
| 54,125 | 1,299,000 | 1,500 | 866 |
| 70,000 | 1,680,000 | 2,039 | 824 |

As shown in Table 1, the flow rate of hydrocarbons is highest between 895 barrels per day (bpd) and 920 bpd. However, as the gas injection rate increases from 375 scf/bbl to 730 scf/bbl, the increase in flow rate becomes smaller at each increment. As such, the monitoring system 26 may select a range of flow rates between 895 bpd and 911 bpd to minimize the amount of gas being injected into the well while maximizing the amount of hydrocarbons being produced by the well.

Referring back to block 98, if the monitoring system 26 determines that the flow rate determined at block 96 is within the range of values, the monitoring system 26 may return to block 94. If, however, the flow rate is not within the range of values, the monitoring system 26 may proceed to block 100 and adjust the gas injection rate based on the expected production rates for different gas injection rates received at block 92.

When adjusting the gas injection rate, the monitoring system 26 may send a command to an electronic device or an actuator that controls a choke or apparatus that injects gas into the well. In one embodiment, the monitoring system 26 may adjust the gas injection rate to a value that corresponds to a flow rate of hydrocarbons within the range of values provided for in block 98. The monitoring system 26 may determine an appropriate gas injection rate to use based on the mathematical expression that represents the expected production rates for different gas injection rates at the well.

In some embodiments, the monitoring system 26 may send one or more commands to components such as the pumpjacks 12, submersible pumps 14, well trees 16, a choke, or some other device coupled to the network of pipelines 24 to adjust their respective operations (e.g., speed, diameter) to ensure that the flow of hydrocarbons is optimized to produce a content of oil that is greater than some threshold with respect to the other phases in the extracted hydrocarbons. When sending commands to components in the hydrocarbon site 10, the monitoring system 26 may send commands to electronic devices (e.g., controller, computing systems) that control the operations of the respective component. As such, the electronic device may include a communication component similar to the communication component 52 described above.

By automatically adjusting the gas injection rate at the well based on real time or near real time flow rates of the hydrocarbons being produced at the well, the monitoring system 26 may enable the well to produce hydrocarbons more efficiently while maintaining the integrity of the well and the corresponding reservoir.

In certain embodiments, the monitoring system 26 may send the results of any analysis performed in the method 90 to other computing devices. The monitoring system 26 may send the results using any suitable wired or wireless protocol. In one embodiment, the monitoring system 26 may send the results to other monitoring systems 26 via the communication network 70. As such, operators located at other wells or other components within the hydrocarbon site 10 may receive information regarding the multiphase measurements of the hydrocarbons produced at the respective well.

The other computing devices may also include any suitable tablet computer, laptop computer, mobile computer, or general-purpose computer that may be accessible to the operator. As such, the operator of a well may adjust the operations of various devices within the hydrocarbon site based on the multiphase measurements of the hydrocarbons produced at the respective well.

In certain embodiments, the monitoring system 26 may also display the results of any analysis performed in the method 90. As such, the monitoring system 26 may depict values that represent the current flow rates of the hydrocarbons being produced, the mathematical expression used to describe the flow rate characteristics versus the gas injection rates, the line graphs 112 and 114, and the like on the display 62 or the like. The provided visualizations on the display 26 may provide the operator with information at the physical location of the well to enable the operator to control various equipment (e.g., well tree 16) in the hydrocarbon site 10 to efficiently produce hydrocarbons. For instance, if the flow rates indicate that the gas injection rate is above some threshold, the operator may decrease a choke size of the well tree 16 to decrease the gas injection rate.

In addition to controlling the flow of hydrocarbons at one well using the gas injection rates at the well, the monitoring system 26 may also control the flow of hydrocarbons of other wells based on the gas injection rate at one well. For instance, the production of hydrocarbons at a first well may be affected by the gas injection rate used at a second well. That is, as horizontal drilling techniques become more advanced, several wells may be drilled in a single location. This number of wells that produce hydrocarbons from the same reservoir may be referred to as well pads. With this in mind, it may be useful to monitor the production of hydrocarbons at a number of wells in the hydrocarbon site 10 via the network 70 and control the gas injection rate at one or more wells to control the aggregate production of hydrocarbons at the number of wells that produce hydrocarbons from the same reservoir. For instance, the production of hydrocarbons at a first well may be affected by the gas injection rate used at a second well. As such, in one embodiment, the monitoring system 26 may measure or estimate the production of hydrocarbons at the number of wells based on the gas injection rate used at a particular well. Based on the measured or estimated production of hydrocarbons at the number of wells, the monitoring system 26 may select a particular target gas injection rate to provide at a particular well.

Figure 7:
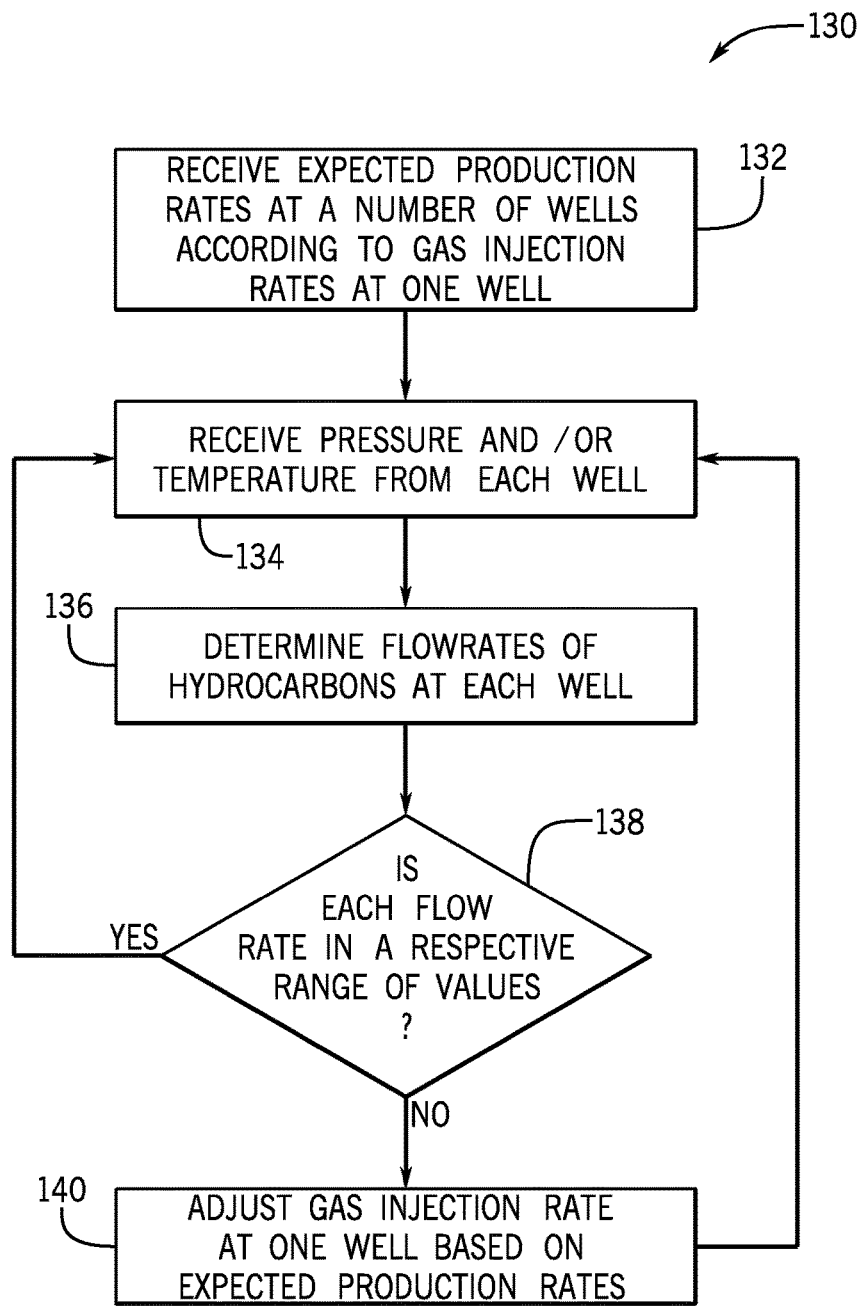
FIG. 7 illustrates a flowchart of a method for adjusting the production of hydrocarbons being produced at various wells in the hydrocarbon site of FIG. 1 based on a gas injection rate used at a particular well, in accordance with embodiments presented herein.

Keeping the foregoing in mind, FIG. 7 illustrates a flow chart of a method 130 for adjusting the gas injection rate at a particular well to control the production of hydrocarbons at a number of wells. The method 130 may be used for monitoring and/or controlling the operations of natural flowing wells or wells that use artificial lifts to extract hydrocarbons from a reservoir. In either case, since the monitoring system 26 is disposed at the well site, the operations of the well may be monitored, controlled, and operated locally. In this manner, the operations of the well may be optimized or monitored with or without an established communication link to gateway device 72, the PLC 74, the control system 76 (e.g., SCADA), the network 78, or the like. Moreover, since the adjustments of gas injection rates at a well is performed by the monitoring system 26 located at the well, the well may adjust the operational characteristics of the well based on real or near-real time measurements, thereby improving the efficiency in which the well operates (e.g., produced hydrocarbons).

Although the following description of the method 130 describes a certain procedure, it should be noted that the procedure should not be limited to the order that is depicted in FIG. 7. Instead, it should be understood that the procedure may be performed in any suitable order. Moreover, it should be noted that, in some embodiments, certain portions of the method 130 may not be performed.

Referring now to FIG. 7, at block 132, the monitoring system 26 may receive expected production rates one or more wells at a hydrocarbon site 10 with respect to a number of different gas injection rates being applied to one particular well. That is, the monitoring system 26 may receive data similar as to the data described above with respect to block 92 of FIG. 5. As such, in certain embodiments, the monitoring system 26 may use one or more hydrocarbon models associated with the respective wells to determine the effects to the respective flow rates of hydrocarbons at the respective wells when the gas injection rate at one particular well is modified.

In one embodiment, the expected production rates of the number of wells with regard to the gas injection rates at a particular well for each well may be represented by a respective mathematical function determined in a similar manner as described above. That is, after the production rates for each well is simulated under different gas injection rates at a particular well, the monitoring system 26 may determine a best fit line for the results and determine a mathematical function that represent the curve for each well.

At block 134, the monitoring system 26 at the particular well that is associated with the gas injection rates that may affect the production of other wells may receive pressure and/or temperature data from each well described above. As such, the monitoring system 26 may receive data from sensors or the like regarding various properties as described above with reference to block 94 of FIG. 5.

At block 136, the monitoring system 26 may determine the flow rate of the hydrocarbons produced at each respective well based on the respective hydrocarbon model for each well. The monitoring system 26 may determine the current flow rate for each well using a similar process as described above with reference to block 96 of FIG. 5.

At block 138, the monitoring system 26 may determine whether the flow rate at each respective well is within a respective range of values. As such, the monitoring system 26 may analyze the expected production rates data provided at block 132 using a similar process as described above with reference to block 98 of FIG. 5.

If each of the flow rates of the respective wells is within the range, the monitoring system 26 may return to block 134. If, however, the monitoring system 26 determines that one or more of the respective flow rates are not in the respective range of values, the monitoring system 26 may proceed to block 140.

At block 140, the monitoring system 26 may adjust the gas injection rate at a particular well based on the expected production rates received at block 132. That is, the monitoring system 26 may send commands to controllers, control systems, or the like that controls a choke, actuator, or the like, such that the commands cause the gas injection rate at the well associated with the monitoring system 26 to change. The monitoring system 26 may adjust the gas injection rate such that the respective flow rates at the respective wells may be within the respective ranges mentioned above with reference to block 138.

In addition to adjusting the gas injection rates, the monitoring system 26 may also display the data determined at various blocks in the method 130 via the display 62 as described above with reference to the method 90 of FIG. 5. Moreover, the monitoring system 26 may also send the data determined at various blocks in the method 130 to other computing devices or other monitoring systems 26 via the network 70 or the like as mentioned above with reference to the method 90 of FIG. 5.

Figure 8:
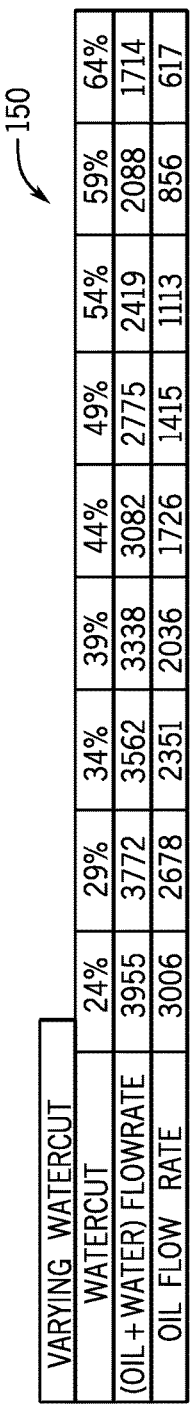
FIG. 8 illustrates a chart of watercut values with respect to oil and water flow rates and oil flow rates, in accordance with embodiments presented herein.

With the processes described above for the method 90 and the method 130 of FIGS. 5 and 7 in mind, the flow rates of the oil and water or of just oil may be characterized according to a curve or mathematical expression by simulating the hydrocarbon production at a well according to the hydrocarbon model associated with the well at various watercut levels. The watercut level may indicate a portion or percentage of water that may be part of the flow of hydrocarbons being extracted from a well. In one embodiment, after determining the multiphase properties of the hydrocarbons based on the hydrocarbon model and the data available at the well, the monitoring system 26 may simulate the flow rates of the hydrocarbons at various watercut levels. For instance, FIG. 8 illustrates a chart 150 of watercut values with respect to oil and water flow rates and oil flow rates.

After simulating the flow rates of the hydrocarbons at the well for various watercut levels, the monitoring system 26 may determine the oil flow rate of the hydrocarbons being produced based on the watercut level. That is, if the watercut level is 39% and the produced hydrocarbons (e.g., oil and water) is 3338 barrels per day, the monitoring system 26 may determine that 61% of the produced hydrocarbons include just oil.

Figure 9:
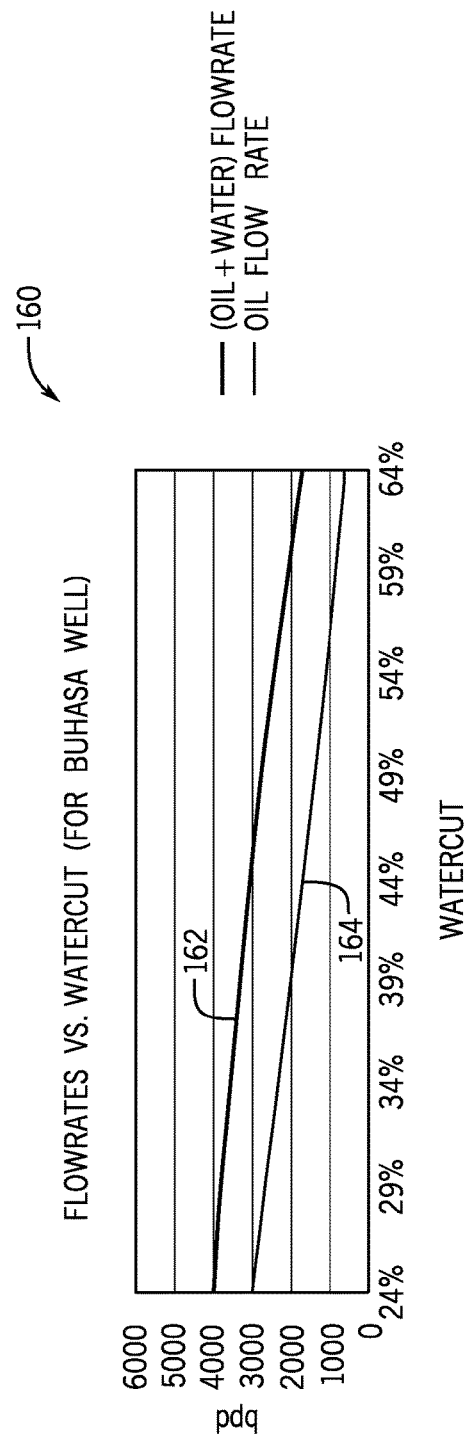
FIG. 9 illustrates a graph of watercut values with respect to oil and water flow rates and oil flow rates, in accordance with embodiments presented herein.

Using the simulated flow rates of oil and water and just oil, the monitoring system 26 may plot the simulated results in a graph of flow rates versus watercut levels. For instance, FIG. 9 illustrates a line graph 160 of watercut values with respect to oil and water flow rates and oil flow rates. Referring to the graph 160, line 162 represents the oil and water flow rate and line 164 represents the oil flow rate. In one embodiment, after generating the line 162 and the line 164, the monitoring system 26 may determine a mathematical expression for each line. Using the mathematical expression, the monitoring system 26 may determine the oil and water flow rate and the oil flow rates based on various watercut levels as indicated in the multiphase measurements obtained via the hydrocarbon model and data (e.g., pressure and/or temperature) acquired at the well. Additionally, in some embodiments, the monitoring system 26 may display the results of the simulation described above (e.g., chart 150), the graph 160, the mathematical expressions, and the like via the display 62. Moreover, in some embodiments, the monitoring system 26 may send the results of the simulation described above (e.g., chart 150), the graph 160, the mathematical expressions, and the like to other computing devices or monitoring systems 26 as described above.

Figures 10, 11:
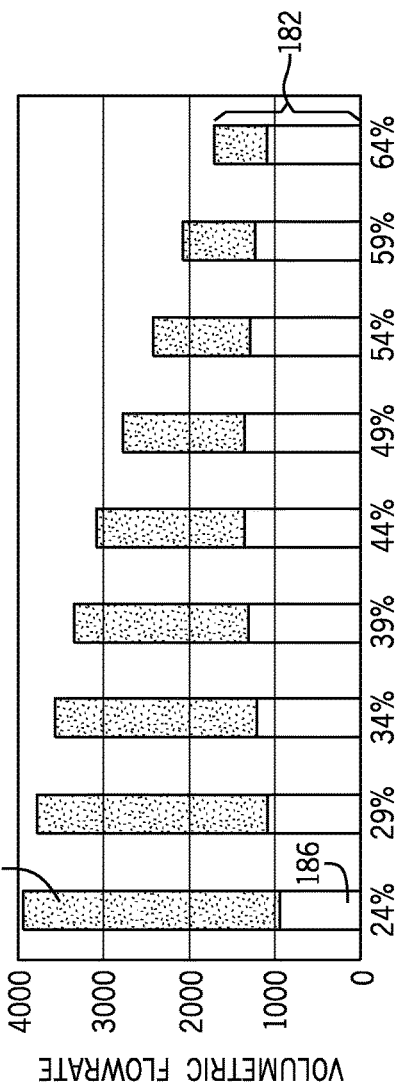
FIG. 10 illustrates a chart of watercut values with respect to total flow rates, water flow rates, and oil flow rates, in accordance with embodiments presented herein.
FIG. 11 illustrates a bar graph of total flow rates with respect to oil flow rates and water flow rates, in accordance with embodiments presented herein.

Using the oil and water flow rate and the oil flow rate determined above and listed in the chart 150, the monitoring system 26 may determine the water flow rate as indicated in FIG. 10. FIG. 10 illustrates a chart 170 of watercut values with respect to total flow rates, water flow rates, and oil flow rates. By determining the water flow rate, the monitoring system 26 may depict the flow rates of: (1) the oil and water; (2) the water; and (3) the oil using a bar graph.

FIG. 11 illustrates a bar graph 180 of total flow rates with respect to oil flow rates and water flow rates. As shown in FIG. 11, bar 182 represents the total flow rate or the flow rate of the oil and the water being produced at the well having a 24% watercut level. With this in mind, bar 182 is composed of bar 184 and bar 186, which represents the oil flow rate and the water flow rate, respectively. Like the data illustrated above in the chart 150 and the graph 160, in some embodiments, the monitoring system 26 may display the results of the chart 170, the graph 180, and the like via the display 62. Moreover, in some embodiments, the monitoring system 26 may send the chart 170, the graph 180, and the like to other computing devices or monitoring systems 26 as described above.

In addition to simulating the various flow rates at different watercut levels, the monitoring system 26 may simulate various flow rates at different wellhead pressure values. FIG. 12 illustrates a chart 190 of wellhead pressure with respect to total flow rates, oil flow rates, and water flow rates. In one embodiment, the monitoring system 26 may simulate the values provided in the chart 190 based on the hydrocarbon model for a particular well and the data (e.g., pressure and/or temperature) available at the well using a similar process as described above with reference to FIGS. 8 and 9.

Figure 13:
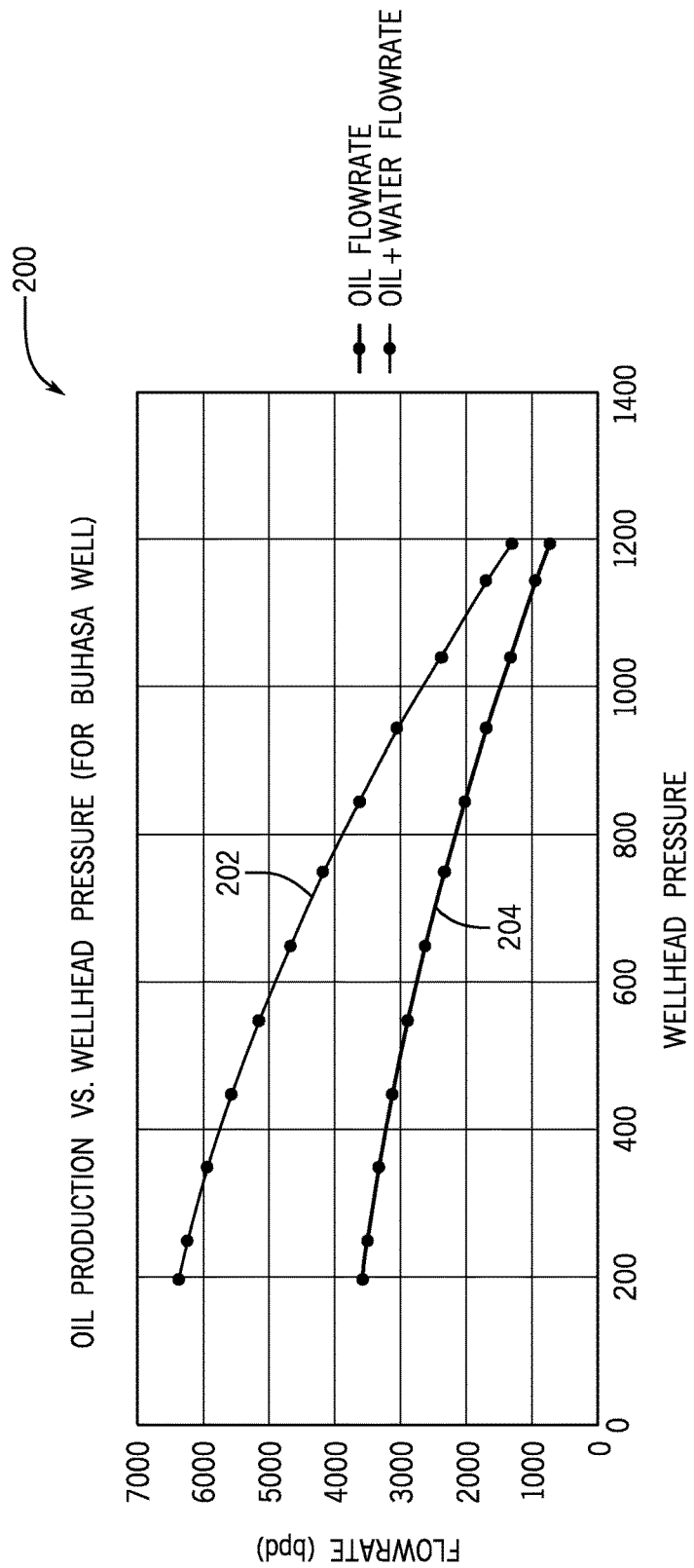
FIG. 13 illustrates a graph of wellhead pressure with respect to total flow rates and oil flow rates, in accordance with embodiments presented herein.

In certain embodiments, the monitoring system 26 may plot the simulated results of the chart 190 on a graph as described above. FIG. 13 illustrates a graph 200 of wellhead pressure with respect to total flow rates and oil flow rates based on the data available with the chart 190. Referring to the graph 200, line 202 represents the flow rate of the oil and water and line 204 represents the flow rate of the oil. Like the mathematical expressions mentioned above, the monitoring system 26 may determine a mathematical function that describes the line 202 and the line 204 by finding a best fit curve or the like. After determining the respective mathematical function, the monitoring system 26 may send commands to controllers or control systems that may control actuators, chokes, valves, or the like to adjust the wellhead pressure such that the oil flow rate or the oil and water flow rate or both is above some threshold.

Additionally, like the data illustrated above in the chart 150 and the graph 160, in some embodiments, the monitoring system 26 may display the results of the chart 190, the graph 200, and the like via the display 62. Moreover, in some embodiments, the monitoring system 26 may send the chart 190, the graph 200, and the like to other computing devices or monitoring systems 26 as described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a monitoring device configured to receive data associated with one or more properties at a well, wherein the monitoring device is configured to:
determine a plurality of expected flow rates of hydrocarbons produced from the well with respect to a plurality of gas injection rates associated with the well based on a hydrocarbon model configured to estimate the plurality of expected flow rates of hydrocarbons;
determine a current flow rate of hydrocarbons at the well based on the data and the hydrocarbon model;
determine, based on the plurality of expected flow rates, a first range of flow rates that substantially maximizes a flow rate of hydrocarbons at the well, and a second range of gas injection rates that corresponds to the first range of flow rates;
determine whether the current flow rate of hydrocarbons at the well is within the first range of flow rates; and
adjust a gas injection rate at the well in response to the current flow rate of hydrocarbons at the well not being within the first range of flow rates, wherein adjusting the gas injection rate comprises sending one or more commands to one or more components associated with the well, wherein the one or more commands are configured to cause the one or more components to adjust the gas injection rate to be within the second range of gas injection rates.

2. The system of claim 1, wherein the plurality of expected flow rates of hydrocarbons comprises a first expected flow rate that corresponds to a first flow rate of oil and water.

3. The system of claim 2, wherein the plurality of expected flow rates of hydrocarbons comprises a second expected flow rate that corresponds to a second flow rate of oil.

4. The system of claim 1, wherein the hydrocarbon model is configured to estimate multiphase properties of a flow of hydrocarbons at the well based on the data, wherein the multiphase properties comprise a first fraction of oil in the flow of hydrocarbons, a second fraction of water in the flow of hydrocarbons, and a third fraction of gas in the flow of hydrocarbons.

5. The system of claim 1, wherein the data comprises tubing head pressure, tubing head temperature, casing head pressure, casing head temperature, flowline pressure, flowline temperature, choke size, a water fraction amount, an oil fraction amount, an oil density value, a gas density value, a water density value, or any combination thereof.

6. The system of claim 1, wherein the plurality of expected flow rates of hydrocarbons produced from the well with respect to the plurality of gas injection rates is determined based on a simulation performed using the hydrocarbon model.

7. The system of claim 6, wherein the monitoring device is configured to:
plot a plurality of values on a graph based on the simulation;
determine a mathematical function based on the plot; and
determine the plurality of expected flow rates of hydrocarbons produced from the well with respect to the plurality of gas injection rates based on the mathematical function.

8. The system of claim 1, wherein the current flow rate of hydrocarbons at the well corresponds to a flow rate of oil and water, and the monitoring device is configured to:
determine a watercut level associated with the hydrocarbons at the well;
determine a second current flow rate of hydrocarbons at the well based on the current flow rate, wherein the second current flow rate corresponds to a flow rate of oil;
determine whether the current flow rate exceeds a first threshold;
determine whether the second current flow rate exceeds a second threshold; and
adjust the gas injection rate in response to the current flow rate not exceeding the first threshold or in response to the second current flow rate not exceeding the second threshold.

9. A system, comprising:
a monitoring device configured to receive data associated with one or more properties at a well, wherein the monitoring device is configured to:
determine a plurality of expected flow rates of hydrocarbons produced from a plurality of wells with respect to a plurality of gas injection rates based on the data, wherein each of the plurality of gas injection rates is associated with a respective one of the plurality of wells;
determine a plurality of current flow rates of hydrocarbons based on the data, wherein each of the plurality of current flow rates is associated with a well of the plurality of wells;
determine, based on the plurality of expected flow rates, a first plurality of ranges of flow rates, wherein each of the first plurality of ranges of flow rates is configured to substantially maximize a respective flow rate of the plurality of current flow rates;
determine, based on the plurality of expected flow rates, a second plurality of ranges of gas injection rates that corresponds to the first plurality of ranges of flow rates, wherein each of the second plurality of ranges of gas injection rates corresponds to a respective range of flow rates of the first plurality of ranges of flow rates;
determine whether a current flow rate of the plurality of current flow rates is within a range of flow rates of the first plurality of ranges of flow rates; and
adjust a gas injection rate at the well in response to the current flow rate associated with the well not being within a range of flow rates of the first plurality of ranges of flow rates, wherein adjusting the gas injection rate comprises sending one or more commands to one or more components associated with the well, wherein the one or more commands are configured to cause the one or more components to adjust the gas injection rate to be within a range of gas injection rates of the second plurality of gas injection rates.

10. The system of claim 9, comprising a well pad associated with the plurality of wells and the well.

11. The system of claim 10, wherein the well pad is associated with a reservoir having the hydrocarbons.

12. The system of claim 9, wherein the data comprises tubing head pressure, tubing head temperature, casing head pressure, casing head temperature, flowline pressure, flowline temperature, choke size, a water fraction amount, an oil fraction amount, an oil density value, a gas density value, a water density value, or any combination thereof.

13. The system of claim 9, comprising a display configured to visualize the plurality of expected flow rates of hydrocarbons produced from the plurality of wells with respect to the plurality of gas injection rates.

14. The system of claim 9, wherein the monitoring device is configured to send the plurality of expected flow rates of hydrocarbons produced from the plurality of wells with respect to the plurality of gas injection rates to one or more computing devices.

15. A method, comprising:
receiving, via a processor, data associated with one or more properties at a well;
determining, via the processor, a plurality of expected flow rates of hydrocarbons produced from the well with respect to a plurality of gas injection rates associated with the well based on a hydrocarbon model configured to estimate the plurality of expected flow rates of hydrocarbons;
determining, via the processor, a current flow rate of hydrocarbons at the well based on the data and the hydrocarbon model;
determining, via the processor and based on the plurality of expected flow rates, a first range of flow rates that substantially maximizes a flow rate of hydrocarbons at the well, and a second range of gas injection rates that corresponds to the first range of flow rates;
determining, via the processor, whether the current flow rate of hydrocarbons at the well is within the first range of flow rates; and
adjusting, via the processor, a gas injection rate at the well in response to the current flow rate associated with the well not being within the first range of flow rates, wherein adjusting the gas injection rate comprises sending one or more commands to one or more components associated with the well, wherein the one or more commands are configured to cause the one or more components to adjust the gas injection rate to be within the second range of gas injection rates.

16. The method of claim 15, wherein the plurality of expected flow rates of hydrocarbons comprises a flow rate of oil and water.

17. The method of claim 15, wherein the hydrocarbon model is configured to estimate multiphase properties and a watercut level of a flow of hydrocarbons at the well based on the data.

18. The method of claim 15, wherein the data comprises a water fraction amount, an oil fraction amount, an oil density value, a gas density value, a water density value, or any combination thereof.

19. The method of claim 15, comprising:
plotting a plurality of values on a graph based on a simulation performed using the hydrocarbon model;
determining a mathematical function based on the plot; and
determining the plurality of expected flow rates of hydrocarbons produced from the well with respect to the plurality of gas injection rates based on the mathematical function.

20. The method of claim 15, wherein the current flow rate corresponds to a flow rate of oil and water, and the method comprises:
determining, via the processor, a second current flow rate of hydrocarbons at the well corresponding to a flow rate of oil based on the data and the hydrocarbon model;
determining, via the processor, whether the second current flow rate exceeds a threshold; and
adjusting, via the processor, the gas injection rate in response to the second current flow rate not exceeding the threshold.

* * * * *